(12) United States Patent
Innes et al.

(10) Patent No.: US 10,129,729 B2
(45) Date of Patent: *Nov. 13, 2018

(54) SMARTPHONE BLUETOOTH HEADSET RECEIVER

(71) Applicant: DISH Technologies L.L.C., Englewood, CO (US)

(72) Inventors: David Innes, Littleton, CO (US); Henry Gregg Martch, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,595

(22) Filed: Oct. 11, 2017

(65) Prior Publication Data

US 2018/0035250 A1 Feb. 1, 2018

Related U.S. Application Data

(63) Continuation of application No. 15/409,051, filed on Jan. 18, 2017, now Pat. No. 9,820,087, which is a
(Continued)

(51) Int. Cl.
| | |
|---|---|
| *H04B 1/38* | (2015.01) |
| *H04M 1/00* | (2006.01) |
| *H04W 4/80* | (2018.01) |
| *G10L 21/02* | (2013.01) |
| *G10L 21/038* | (2013.01) |
| *G06F 17/28* | (2006.01) |
| *G10L 21/10* | (2013.01) |

(Continued)

(52) U.S. Cl.
CPC .............. *H04W 4/80* (2018.02); *G06F 3/165* (2013.01); *G06F 17/289* (2013.01); *G10L 15/26* (2013.01); *G10L 21/0205* (2013.01); *G10L 21/038* (2013.01); *G10L 21/10* (2013.01)

(58) Field of Classification Search
CPC ..... H04W 4/008; H04W 4/80; H04M 1/6058; H04M 1/6066; H04M 1/72527; H04M 1/7253; H04M 2201/38; H04M 2250/02; H04B 2001/3866
USPC ............................ 455/41.1, 41.2, 41.3, 557
See application file for complete search history.

(56) References Cited

U.S. PATENT DOCUMENTS

| | | |
|---|---|---|
| 9,584,871 B2 | 2/2017 | Innes et al. |
| 2005/0278767 A1 | 12/2005 | Ahluwalia |

(Continued)

FOREIGN PATENT DOCUMENTS

| | | |
|---|---|---|
| EP | 2 672 685 A2 | 12/2013 |
| WO | 2006/036207 A1 | 4/2006 |

OTHER PUBLICATIONS

European Search Report from EP 14 19 8507 dated Apr. 28, 2015 (2 pages).

*Primary Examiner* — Quochien B Vuong
(74) *Attorney, Agent, or Firm* — Seed IP Law Group LLP

(57) ABSTRACT

Systems and methods are provided for allowing a user with a Smartphone to pair the Smartphone with another Bluetooth device to receive audio that is played to the user over headphones or through speakers on the Smartphone. Further, an audio processing module is used to modify the audio presented to the user, extract closed captioning text to be displayed to the user, find information relevant to the audio to be displayed to the user, and pause audio content sent to the Smartphone when phone calls or other Smartphone interruptions occur.

18 Claims, 4 Drawing Sheets

Related U.S. Application Data continuation of application No. 14/134,088, filed on Dec. 19, 2013, now Pat. No. 9,584,871.

(51) Int. Cl.
*G10L 15/26* (2006.01)
*G06F 3/16* (2006.01)

(56) References Cited

U.S. PATENT DOCUMENTS

| | | |
|---|---|---|
| 2007/0060054 A1 | 3/2007 | Romesburg |
| 2011/0313775 A1 | 12/2011 | Laligand et al. |
| 2013/0198630 A1 | 8/2013 | Lake, Jr. et al. |
| 2014/0344876 A1 | 11/2014 | Yao et al. |
| 2015/0067726 A1 | 3/2015 | Glasser |
| 2015/0208161 A1 | 7/2015 | Lesaffre |
| 2017/0134888 A1 | 5/2017 | Innes et al. |

SMARTPHONE BLUETOOTH HEADSET RECEIVER

BACKGROUND

Technical Field

The present disclosure generally relates to receiving and presenting audio over a Bluetooth connection to a user, and more particularly to receiving audio at a Smartphone that is connected by Bluetooth™ to a device transmitting audio and receiving the video on a different display device using a different connection, other than Bluetooth.

BRIEF SUMMARY

In one embodiment, a set top box receives audiovisual programming content, for example multiple channels of content coming from a satellite or cable provider. The set top box decodes those multiple channels of content and enables a user to select a particular channel to be displayed on a display device, for example a television set. Set top boxes that contain Bluetooth transceivers also enable a user to listen to audio portion of the displayed audiovisual content by pairing a Bluetooth listening device with the Bluetooth transceiver in the set top box. Examples of user listening devices include Bluetooth earpieces and Bluetooth headsets. Disclosed herein are systems and methods to enable a user to receive audio content by pairing a Bluetooth-enabled Smartphone device with a Bluetooth-enabled set-top box, or other device, so that the user can listen to audio using headphones connected to the Smartphone.

In addition, an audio processing module on the Smartphone is able to provide additional functionality as audio content is sent to the listener, including but not limited to pausing the presented content if the user receives a phone call, to adjusting the sound for optimal user listening, or, to analyzing the audio content and to display information related to the audio content on the Smartphone display.

DETAILED DESCRIPTION

Figure 1:
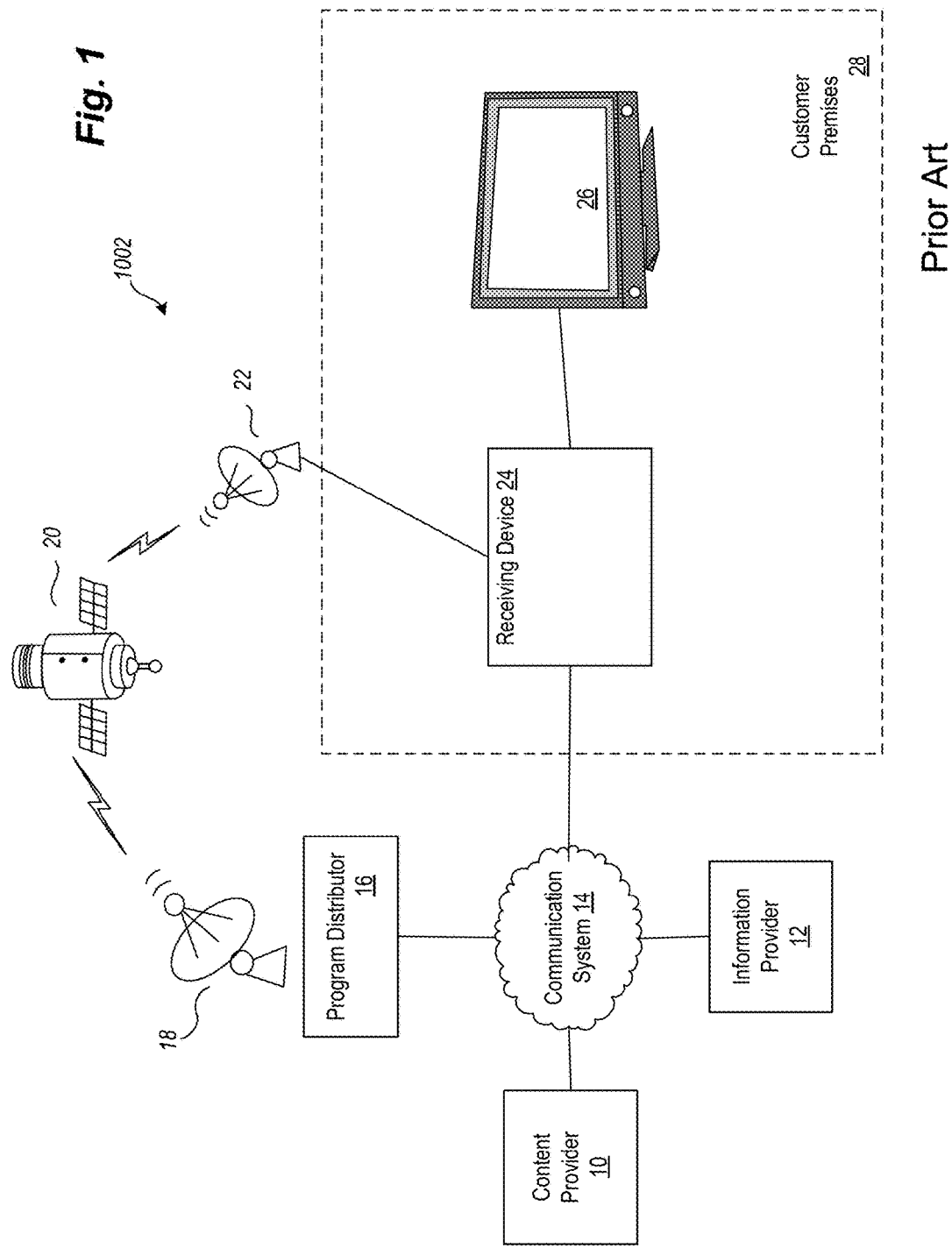
FIG. 1 shows a context diagram for providing audiovisual content to a receiving device as is known in the art.

FIG. 1 is a diagram 1002 of a context diagram for delivering audiovisual content to a receiving device as is conventionally done in the prior art. Content, including audiovisual content, is created by content provider 10. This content provider may include but is not limited to film studios, television studios, and independent content producers such as AMC, HBO, or Showtime. A content provider may also include individuals that capture personal or home videos and who want to distribute these videos to others over YouTube™ or some other distribution mechanism. A content provider may also focus on audio content, such as audio-books or music. Information providers 12 create and distribute information that describes or supports audiovisual content and may include data such as programming data, timeslot data, pay-per-view and related data, or other information that supports content as it is distributed to the user. Communication system 14 is a network, which may be made up of any network capable of transmitting data, such as the Internet, X.25 networks, or a series of smaller or private connected networks that carry the content and information to program distributor 16. The program distributor 16, in some embodiments, will distribute the programs and data to the customer directly through communication system 14. In other embodiments, the programs and data will be sent through uplink 18 which goes to satellite 20 and back to the downlink station 22 which may also include a head end (not shown). At this point, the content and data is sent to an individual receiving device 24. In one embodiment, customers throughout neighborhood may subscribe to this content and receive it through receiving devices 24 in each of their respective homes. Examples of a receiving device 24 are a set-top box, a cable connection box, a computer or the like. Customers may have one or more receiving devices 24 that are attached to one or more display devices 26 within a business or end user customer premises 28.

Figure 2:
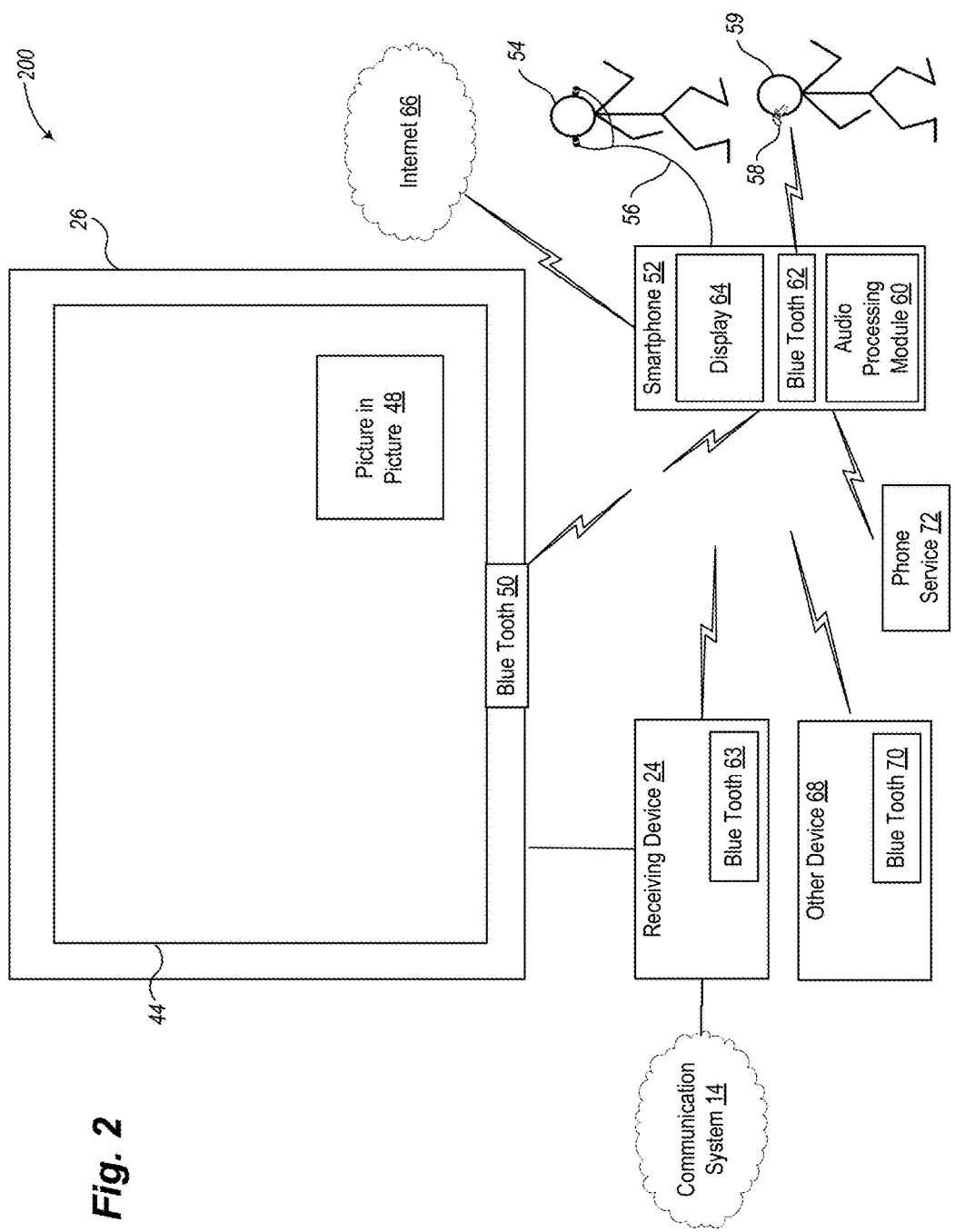
FIG. 2 is a diagram of one non-limiting embodiment of a system for linking a Smartphone to a receiving device.

FIG. 2 is a diagram 1004 of a non-limiting embodiment of a customer's premises 28 according to the disclosure herein. The receiving device 24 receives content from communication system 14, in particular audiovisual content to be presented on display unit 26. Receiving device 24, which may take the form of a set top box, has a Bluetooth component 63 that allows the set-top box to pair with other Bluetooth devices so that the two devices can communicate over the Bluetooth protocol. The Bluetooth module 63 may be a single chip within receiving device 24, or may be a Bluetooth transceiver external to the receiving device 24. Display device 26, in the current embodiment, includes display area 44 on which visual content, for example a movie played from a satellite channel, is displayed. Display device 26 may also include a second display area, picture in picture area 48, where a different channel of visual content is displayed. In some embodiments, this second picture may appear as a tiled display next to display area 44, rather than a smaller display area 48 overlapping larger display area 44. In other embodiments, display area 48 may appear on a second display device (not shown) connected to the receiving device 24.

In one or more embodiments, a Bluetooth module 50 within display device 26 may be paired with other Bluetooth-enabled devices. Therefore, in one or more embodiments the audio that corresponds to audiovisual content presented on display area 44 or display area 48 may be transmitted either by the Bluetooth transmitter 63 in receiving device 24, or the Bluetooth transmitter 50 in display device 26. In some embodiments, separate Bluetooth connections may be established to transmit the separate audio associated with content presented in display area 44 and display area 48 to separate Bluetooth devices.

To listen to the audio of the content presented by receiving device 24, Smartphone 52 would be connected via Bluetooth module 62 to Bluetooth modules 50 or 63, so that the audio from either device would be sent directly to the Smartphone 52. Examples of Smartphones are the iPhone™ and Galaxy™ Smartphones, that includes the ability to run applications, support Bluetooth and have full mobile and cell phone capability.

There are many advantages to sending audio to a Smartphone 52. Wireless Bluetooth headphones are expensive.

Not everyone has them, and those people that do, often find that those headphones do not hold a charge for long, and must be frequently recharged. In some instances, the battery life of Bluetooth headphones are less than the length of a feature movie. In contrast, Smartphones 52 typically have a long battery life, are typically sold with earbuds 56, are typically kept alongside their users, and typically have Bluetooth capability 62. Also, users typically carry earbuds 56 or other listening devices 58 to hear audio play on the smart phone 52 without disturbing people around the user. This way, most Smartphone users have the hardware to connect to and receive audio from Bluetooth devices without having to buy a special Bluetooth headset.

Once Smartphone 52 is paired with the Bluetooth device to send the audio portion of the presented audiovisual content, users 54, 59 may listen to audio on Smartphone 52 in at least two different ways. In one embodiment, user 54 is connected to Smartphone 52 via earbuds 56 that are plugged directly into the Smartphone 52 audio jack. In a second embodiment, user 59 has paired Bluetooth earpiece 58 with Smartphone 52 to listen to audio, for example to participate in a phone conversation while driving. In this embodiment, user 59 may always keep Bluetooth earpiece 58 paired with Smartphone 52 to listen to audio, and pair Smartphone 52 with Bluetooth in other devices 50, 63 only when Smartphone 52 is to receive audio from those devices. In other words, if a user always wore their Bluetooth earpiece for their Smartphone 52, and the user wanted to watch television with Bluetooth-enabled receiving device 24, the user would not re-pair their Bluetooth earpiece 58 with Bluetooth component 63 in receiving device 24, but instead would Bluetooth pair Smartphone 52 Bluetooth component 62 to receiving device 24. This way, the user's Bluetooth earpiece device 58 does not have to be re-paired. In other embodiments, a user's Smartphone 52 would be paired in one of the manners above, but the user would listen to audio over the Smartphone 52 speakers.

The description above has focused on a series of embodiments related to presentation of audiovisual content. However, Smart phone 52 may be used to play audio when paired to other devices, such as a car radio, satellite radio, or the like.

In addition to receiving audio, the Bluetooth component 62 within Smart phone 52, may also be used as a way to wake up nearby devices 26, 24 and 68 when the user 54, 59 walk within range of the devices. For example, the devices may be configured to go into a standby mode automatically if Smartphone 52 is not within a threshold proximity of the paired device for certain period of time. For example, suppose user 54 was listening to the audio of a program displayed on device 26 in the user's living room. If the user 54 gets up and leaves during the program for a 20 minute period, then display device 26 may go into standby mode until user 54 returns to the living room with Smartphone 52, at which time the display device 26 will recognize that the Bluetooth module 62 of Smartphone 52 is within proximity and will restart.

The Smartphone 52 itself contains significant computing power that is able to do more than just present audio data received from a Bluetooth connection 50 to a user 54, 59. The Smartphone 52 may contain program modules that are able to gather, analyze, transform and present information. One example is an audio processing module 60 that monitors audio and other data signals received from devices 26, 24 and 68, and provides added capability to users 54, 59 using the Smartphone 52 as a listening device.

In one embodiment, if user 54 is listening to a television program presented on display area 44 and a telephone call from phone service 72 comes into Smartphone 52, the audio processing module 60 may, for example, pause the audio sent to Smartphone 52 so that the user 54 can take the phone call. Once the phone call is complete, the audio will resume playing. In a related example, audio processing module 60 may send commands back to their paired display device 26, 24 and 68 to pause the entire audiovisual content presentation until the user's phone call is over. This gives the user 54, 59 the option of listening to audiovisual content as it is presented while maintaining the flexibility of receiving a phone call. It should be noted that in related embodiments, other functions or communications to the user may pause the presentation of audio content onto Smartphone 52, for example text messages, alert notifications, email messages, and the like. Similarly, in other related embodiments, other commands may be sent to the presentation devices 24, 26 and 68 when the audio processing module 60 detects an activity that would conflict with the audio played on Smartphone 52. Examples of these commands include begin to record the content, rewind the presented content, move the video presentation from the display device 26 to the Smartphone display 64, or raise or lower the volume of the content, while the interrupting event is occurring. For example, if a user 54, 59 was listening to audio on smartphone 52 while watching display device 26 and a Skype™ call came in, the audio processing module 60 would immediately send a command to receiving device 24 to begin to record the video and audio being played, and the user would be available to take the Skype call. When audio processing module 60 determines the Skype call was over, it would send a command to receiving device 24 to begin to play the recorded content so that the user can continue to watch the movie at the point the Skype call came in.

In other embodiments, the audio processing module 60 may monitor the received audio or data content and provide additional information to user 54, 59 depending upon the content received. For example, if the audio processing module 60 determines that an advertisement is being played, audio processing module 60 may alert the user with a notification of "you are listening to a commercial, would you also like to hear a related commercial?" Module 60 may also ask if the user would like to play a related YouTube video, watch some other related content, search for price comparisons of the advertised product or perform other search-related functions in the Internet 66 such as lookup in IMDB™, provide an coupon for the product a commercial is promoting, and the like.

In another embodiment, if audio processing module 60 determines that the user 54, 59 is watching a movie, the audio processing module may search for and provide background information on the movie being watched such as the genre, director, actors, filming locations, and the like.

In these two embodiments, the results of the additional information determined by audio processing module 60 may be displayed on Smartphone 52 display 64. In this way, Smartphone 52 becomes a private second screen application that operates in conjunction with the display device 26. In conjunction with audio processing module 60, the second screen knows what the user 54, 59 is watching and provides the user with additional information.

In another embodiment, the audio processing module 60 recognizes incoming audio and modifies the audio for a better experience for user 54, 59. For example, the audio processing module 60 may perform an audio-leveling function, such as adjusting the volume so that it is always within a certain decibel range, so that the audio as listened to by user 54, 59 is never too soft nor too loud.

In another example, audio processing module 60 may use the computing resources of Smartphone 52 to provide a translation of the incoming audio into another language, which is then presented to the user 54, 59. In one embodiment, this may be done by analyzing the incoming audio signal, decoding it to determine the words spoken to actors, translating the words or phrases into the final language, and sending the audio to the user. Translating the audio signal into a series of words or phrases may be done on Smartphone 52. The identification of different actors and the words or phrases spoken may be determined in a number of different ways. For example, the differing tone, pitch, and/or tenor of the voices may be used to identify which words are spoken by which actor. The translations are then made and the translated audio played to user 54, 59 such that the translated audio and video are substantially in sync. In a related example, closed captioned information may be read and converted into translated audio which is then presented to user 54, 59.

In another example, audio processing module 60 may use the significant computing and data processing resources of Smartphone 52 by performing an audio equalization function to better enable the user 54, 59 to hear sounds or understand words spoken in the audio. For example, people can hear some frequencies better than other frequencies, such as older people that have more difficulty hearing higher frequencies and may need the volume of these frequencies increased. Without equalization, the only way to make these higher frequencies louder is to turn up the volume of the entire audio spectrum, which could cause lower frequencies to become too loud for the user. Equalization breaks up the auditory spectrum into different frequency bands that correspond to, for example, high-range sounds including high-pitched sounds or wind sounds, mid-range sounds such as conversation-level voices, or low-pitched sounds such as base notes. Each of these ranges can then be adjusted for volume, and then recombined back into a single audio signal. This process allows a user 54, 59 to customize the spectrum profile of the audio they listen to that will give them the most enjoyment. This may be particularly helpful in a group of people that includes one person with hearing problems who needs sound equalization while listening to a movie using Smartphone 52 using Bluetooth earpiece 58, while others in the group watch the same movie with no audio equalization.

In addition, the audio processing module 60 may also receive closed captioning information, and present the decoded closed captioning text on the Smartphone display 64 for the user to read as a movie is playing. This closed captioned data may be embedded either in the audio stream, or in a data stream and sent to Smartphone 52 and decoded and presented by audio processing module 60.

The audio processing module 60 may also be used to adjust any delay between the audio and the video as it is presented on display device 26. For example, if an actor's words are heard in a scene before the actor begins to speak. In this example, the audio processing module would delay presentation of the audio to the user 54, 59 so that the audio and video would appear in sync.

Figure 3:
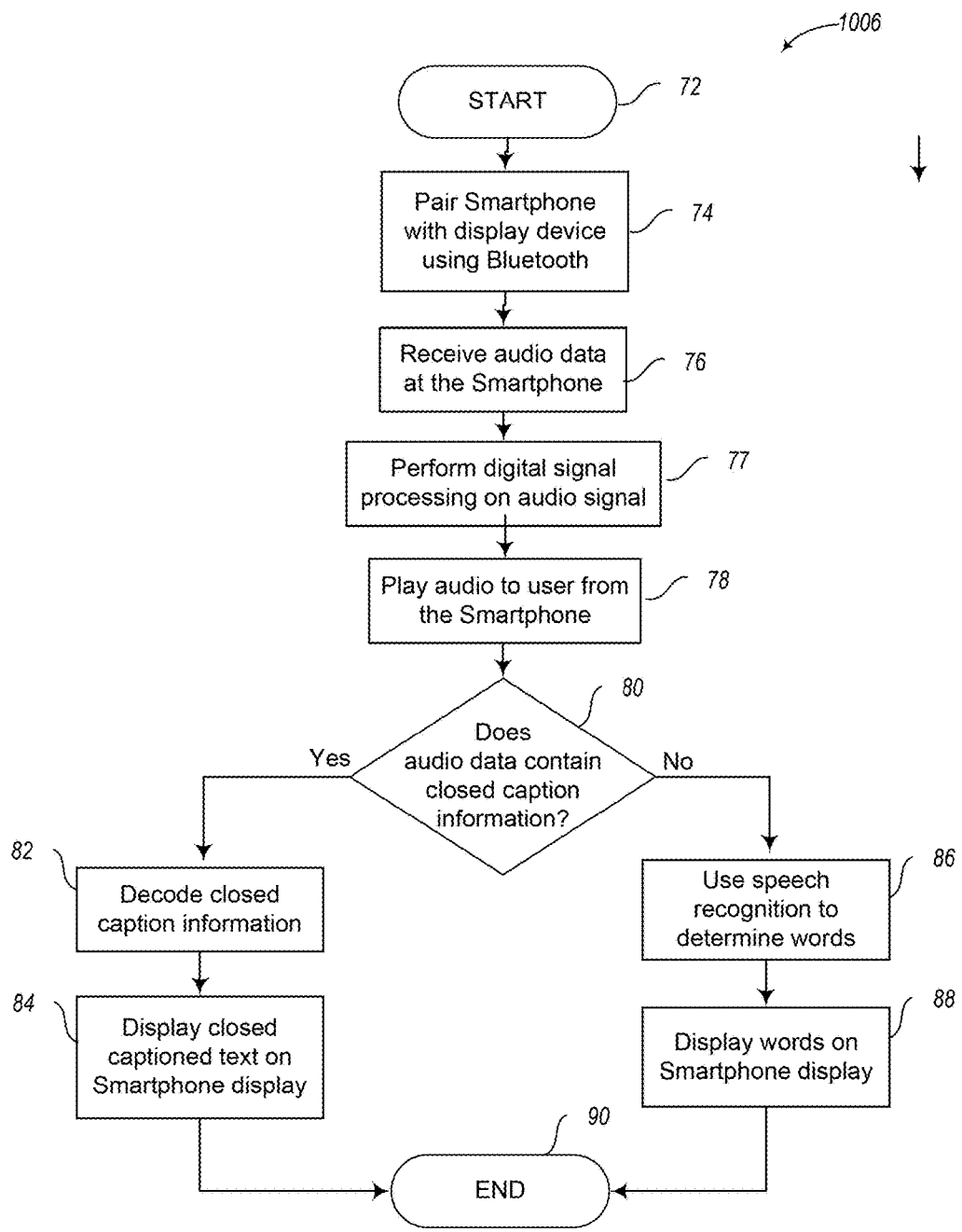
FIG. 3 is a flow diagram of one non-limiting embodiment of a process to detect and display closed captioned information on a Smartphone display.

FIG. 3 shows flow diagram 1006 of one non-limiting embodiment of a process to detect and display closed caption information on a Smartphone display. The process starts at step 72. At step 74, the Smartphone is paired with the display device using the Bluetooth protocol. At step 76, once the two devices are paired audio data is received by the Smartphone, and the audio processing module 60 will perform digital signal processing on the audio signal at step 77. At step 78, the audio is played to the user. The audio is played to the user either through a wired or wireless connection between the Smartphone device and the user's headphones or earbuds 56, or the audio is played through the speakers of the Smartphone. At step 80, the process determines whether the audio data contains closed caption information. If it does, then at step 82 the closed captioned information is decoded, and at step 84 the closed caption text is displayed on the smartphone in synchronization with the presentation of the related video content. If at step 80 the audio data does not contain closed captioned information, then at step 86 audio processing module 60 will attempt to use speech recognition to determine words contained in dialogue, and at step 88 display those words on the Smartphone display as they are spoken. This continues until the viewed program is complete, at which point the process ends at step 90.

Figure 4:
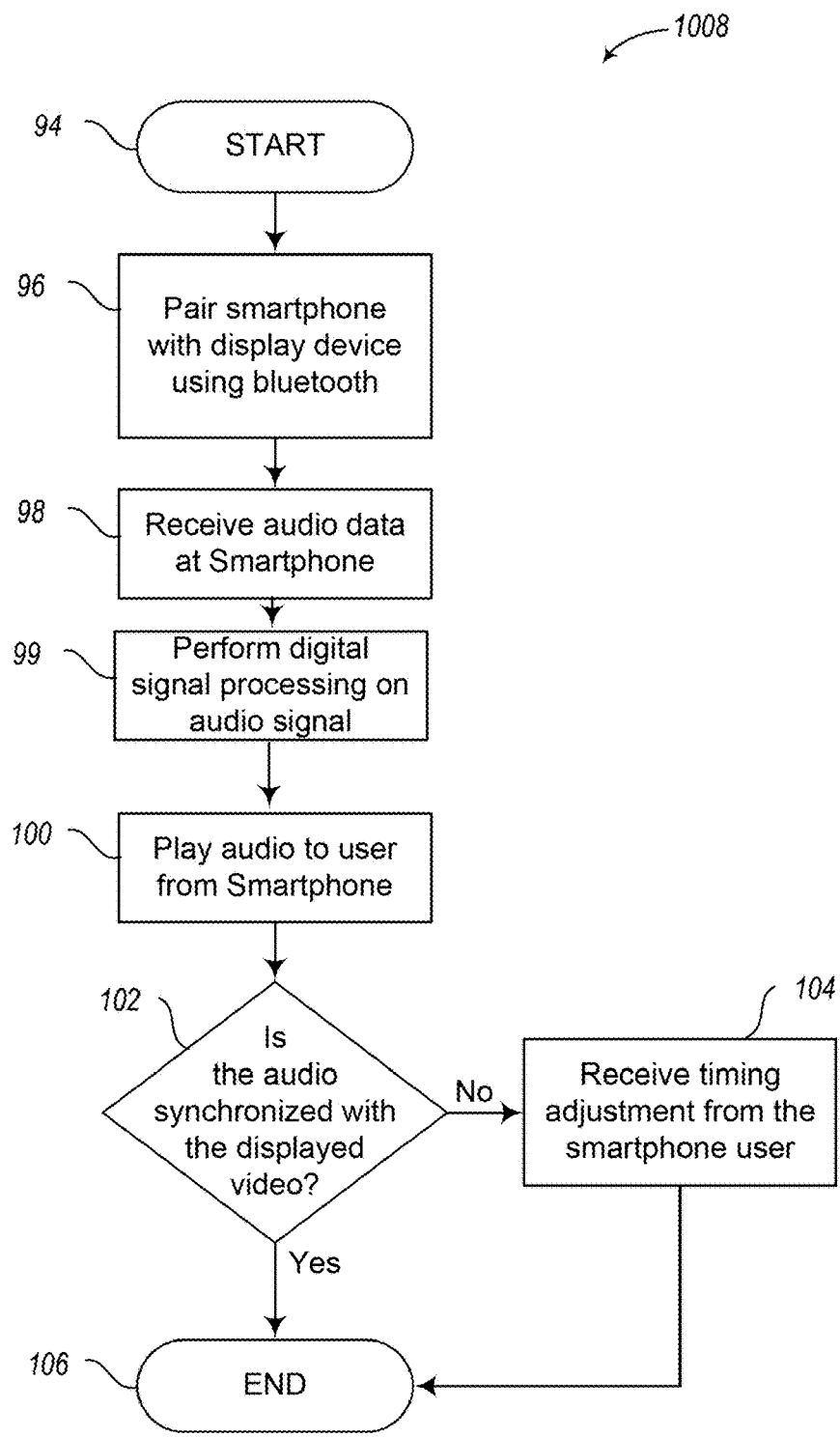
FIG. 4 is a flow diagram of one non-limiting embodiment of a process to synchronize audio on the Smartphone to the presented content on the display.

FIG. 4 shows flow diagram 1008 of one non-limiting embodiment of a process to synchronize audio and video information. The process starts at step 94. At step 96, the Smartphone is paired Bluetooth with the display device. Once the two devices are paired, audio data is received by the Smartphone in step 98. At step 99, the audio processing module 50 will perform digital signal processing on the audio signal. At step 100 of the audio is played to the user by the audio processing module 60. At step 102, the process determines whether the audio being played to the user is synchronized with the display video. If it is not synchronized, then the Smartphone user will input the timing adjustment, and the flow will continue to step 102. If the audio is synchronized with the displayed video, then the process ends at step 106.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    a first Bluetooth-enabled device including a first Bluetooth module configured to output an audio portion; and
    a second Bluetooth-enabled device including:
        an audio processing module;
        a second Bluetooth module, paired with the first Bluetooth module, configured to receive the audio portion and output the audio portion to the audio processing module; and
        a processing module, coupled to the second Bluetooth module, configured to:
            detect that a phone call is received on the second Bluetooth-enabled device;

upon detecting that the phone call is received on the second Bluetooth-enabled device, send, using the second Bluetooth module, a first command to the first Bluetooth module of the first Bluetooth-enabled device to pause sending the audio portion; and when the phone call is completed, send, using the second Bluetooth module, a second command to the first Bluetooth module of the first Bluetooth-enabled device to resume sending the audio portion at a same location in the audio portion at which the pausing of the sending of the audio portion occurred.

2. The system of claim 1, wherein the second Bluetooth-enabled device includes a display.

3. The system of claim 2, wherein the processing module is configured to:
perform audio-to-text conversion on the audio portion to produce text; and
output the text to the display.

4. The system of claim 2, wherein the processing module is configured to:
analyze the audio portion for closed captioned information; and
output the closed captioned information to the display.

5. The system of claim 1, wherein the second Bluetooth-enabled device includes a speaker.

6. The system of claim 5, wherein the processing module is configured to output the audio portion to the speaker.

7. The system of claim 5, wherein the processing module is configured to:
adjust a volume of the audio portion so that the volume falls within a predetermined decibel range;
create an enhanced audio using the volume-adjusted audio portion; and
output the enhanced audio to the speaker.

8. The system of claim 5, wherein the processing module is configured to:
analyze the audio portion;
translate a language of the audio portion into a different language;
create an enhanced audio using the translated audio portion; and
output the enhanced audio to the speaker.

9. The system of claim 5, wherein the processing module is configured to:
divide the audio portion into predetermined frequency ranges;
apply adjustments to a volume of each of the frequency ranges;
combine each of the volume-adjusted frequency ranges to generate enhanced audio; and
output the enhanced audio to the speaker.

10. A method, comprising:
outputting, by a first Bluetooth module of a first Bluetooth-enabled device, an audio portion;
receiving, by a second Bluetooth module of a second Bluetooth-enabled device paired with the first Bluetooth module, the audio portion;
outputting, by the second Bluetooth module, the audio portion to a processing module of the second Bluetooth-enabled device;
detecting, by the processing module, that a phone call is received on the second Bluetooth-enabled device;
upon detecting that the phone call is received on the second Bluetooth-enabled device, sending, using the second Bluetooth module, a first command to the first Bluetooth module of the first Bluetooth-enabled device to pause sending the audio portion; and
when the phone call is completed, sending, using the second Bluetooth module, a second command to the first Bluetooth module of the first Bluetooth-enabled device to resume sending the audio portion at a same location in the audio portion at which the pausing of the sending of the audio portion occurred.

11. The method of claim 10, wherein the second Bluetooth-enabled device includes a display.

12. The method of claim 11, comprising:
performing, by the processing module, audio-to-text conversion on the audio portion to produce text; and
output, by the processing module, the text to the display.

13. The method of claim 11, comprising:
analyzing, by the processing module, the audio portion for closed captioned information; and
outputting, by the processing module, the closed captioned information to the display.

14. The method of claim 10, wherein the second Bluetooth-enabled device includes a speaker.

15. The method of claim 14, comprising:
outputting, by the processing module, the audio portion to the speaker.

16. The method of claim 14, comprising:
adjusting a volume of the audio portion so that the volume falls within a predetermined decibel range;
creating an enhanced audio using the volume-adjusted audio portion; and
outputting the enhanced audio to the speaker.

17. The method of claim 14, comprising:
analyzing the audio portion;
translating a language of the audio portion into a different language;
creating an enhanced audio using the translated audio portion; and
outputting the enhanced audio to the speaker.

18. The method of claim 14, comprising:
dividing the audio portion into predetermined frequency ranges;
applying adjustments to a volume of each of the frequency ranges;
combining each of the volume-adjusted frequency ranges to generate enhanced audio; and
outputting the enhanced audio to the speaker.

* * * * *